United States Patent
Chiu et al.

(10) Patent No.: US 9,195,015 B2
(45) Date of Patent: Nov. 24, 2015

(54) BI-DIRECTIONAL FIBER OPTIC TRANSCEIVERS, HOUSINGS THEREFOR, AND METHODS FOR MAKING AND USING THE SAME

(75) Inventors: Chien-Hsiung Chiu, Chengdu (CN);
Shih-Pin Ko, Chengdu (CN);
Hung-Yuan Chen, Chengdu (CN)

(73) Assignee: Source Photonics, Inc., Chatsworth, CA (US)

( * ) Notice: Subject to any disclaimer, the term of this patent is extended or adjusted under 35 U.S.C. 154(b) by 657 days.

(21) Appl. No.: 13/341,260

(22) Filed: Dec. 30, 2011

(65) Prior Publication Data

US 2013/0004132 A1    Jan. 3, 2013

(30) Foreign Application Priority Data

Jun. 29, 2011   (CN) .......................... 2011 1 0177659
Jun. 29, 2011   (CN) .......................... 2011 1 0177660
Oct. 31, 2011   (CN) .......................... 2011 1 0338123

(51) Int. Cl.
*G02B 6/36*    (2006.01)
*G02B 6/42*    (2006.01)

(52) U.S. Cl.
CPC ............ *G02B 6/4201* (2013.01); *G02B 6/4246* (2013.01)

(58) Field of Classification Search
CPC .................................................. G02B 6/4246
See application file for complete search history.

(56) References Cited

U.S. PATENT DOCUMENTS

| 4,904,043 | A * | 2/1990 | Schweizer ....................... 398/42 |
| 6,040,934 | A * | 3/2000 | Ogusu et al. ................... 398/139 |
| 6,954,592 | B2 | 10/2005 | Tan et al. |
| 7,703,992 | B2 * | 4/2010 | Pfnuer ............................ 385/92 |

(Continued)

FOREIGN PATENT DOCUMENTS

| CN | 2525542 Y | 12/2002 |
| CN | 1659461 A | 8/2005 |

(Continued)

OTHER PUBLICATIONS

Chinese Office Action dated Apr. 27, 2012; Chinese Patent Application No. 201110177660.3; 6 pages total; The State Intellectual Property Office of the P.R.C., People's Republic of China.

(Continued)

*Primary Examiner* — Uyen Chau N Le
*Assistant Examiner* — Chad Smith
(74) *Attorney, Agent, or Firm* — Andrew D. Fortney; Central California IP Group, P.C.

(57) ABSTRACT

A bi-directional fiber optic transceiver includes a laser diode, a photodiode, first and second lenses, all of which share a common linear optical axis, and a housing. The first lens may have transmission increasing film thereon. The second lens may have a reflection increasing film thereon. An optical splitter may be between the first and second lenses. The first and/or second lenses may be spherical, hemispherical or aspheric. The transceiver size is reduced so that a circuit board can accommodate more components or be smaller in size. Utilizing hemispherical lenses can greatly increase the coupling ratio of the optical links between the photodiode, fiber and laser diode. Utilizing aspheric lenses with high coupling can serve high power output requirements. Use of spherical lenses (which extend the focal length) with aspheric lenses enables LD TO assemblies in individual housings to serve in various products.

26 Claims, 7 Drawing Sheets

(56) References Cited

U.S. PATENT DOCUMENTS

| | | | |
|---|---|---|---|
| 7,991,290 B2 | 8/2011 | Tanaka et al. | |
| 2002/0191917 A1* | 12/2002 | Wu et al. | 385/47 |
| 2004/0141698 A1* | 7/2004 | Chen | 385/93 |
| 2004/0208601 A1* | 10/2004 | Tan et al. | 398/135 |
| 2006/0198576 A1* | 9/2006 | Furusawa et al. | 385/24 |
| 2007/0104426 A1* | 5/2007 | Yun et al. | 385/88 |
| 2007/0146881 A1* | 6/2007 | Tanaka et al. | 359/487 |

FOREIGN PATENT DOCUMENTS

| | | |
|---|---|---|
| CN | 1983880 A | 6/2007 |
| JP | 2004037928 A | 2/2004 |

OTHER PUBLICATIONS

Chinese Office Action dated May 30, 2012; Chinese Patent Application No. 201110177659.0; 12 pages total; The State Intellectual Property Office of the P.R.C., People's Republic of China.

Koji Nakahara; "Ball Lens and Optical Transmission / Reception Module"; Espacenet; Japanese Publication No. JP 2004037928 (A); Publication Date: Feb. 5, 2004; Espacenet Database—Worldwide; http://worldwide.espacenet.com/.

Weiwen Chen; "Duplex Focusing Device"; Espacenet; Chinese Publication No. CN 2525542 (Y); Publication Date: Dec. 11, 2002; Espacenet Database—Worldwide; http://worldwide.espacenet.com/.

Ronson Tan, Tat Ming Teo, Wenbin Jiang and Hsing Chung Lee; "Systems, Methods and Apparatus for Bi-Directional Optical Transceivers"; Chinese Publication No. CN 1659461 (A); Publication Date: Aug. 24, 2005; Espacenet Database—Worldwide; http://worldwide.espacenet.com/.

Ken'ichi Yasunobu Tanaka, Masato Shishikura, Kenro Sekine, Toshiki Sugawara and Yasunobu Matsuoka "Optical Prism and Optical Transceiver Module for Optical Communications"; Chinese Publication No. CN 1983880 (A); Publication Date: Jun. 20, 2007; Espacenet Database—Worldwide; http://worldwide.espacenet.com/.

Moshe Amit; "Optical Receiver with Reduced Cavity Size and Methods of Making and Using the Same", U.S. Appl. No. 13/212,137, filed Aug. 17, 2011.

Moshe Amit; "Apparatuses for Reducing the Sensitivity of an Optical Signal to Polarization and Methods of Making and Using the Same"; U.S. Appl. No. 13/193,518; filed Jul. 28, 2011.

Moshe Amit; "Optical Transmitter Assembly, Optical Transceivers Including the Same, and Methods of Making and Using Such Optical Transmitter Assemblies and Optical Transceivers"; U.S. Appl. No. 13/223,150, filed Aug. 31, 2011.

Hung-Yuan Chen, E-Min Chou, Chin-Hao Fu and Chih-Lung Nien; "Optical Devices and Methods of Making and Using the Same"; U.S. Appl. No. 13/339,874, filed Dec. 29, 2011.

Chien-Hsiung Chiu, Hung-Yuan Chen, Chih-Lung Nien, Che-Jen Chang, Shih-Pin Ko, Pei-Keng Fu and Tsai-Wei Chen; "Triplexer and/or Optical Line Terminal Compatible with a 10G Ethernet Passive Optical Network and a Housing Therefor"; U.S. Appl. No. 13/341,306, filed Dec. 30, 2011.

* cited by examiner

(Background)

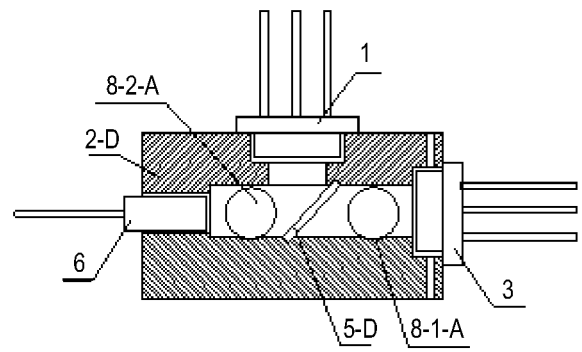
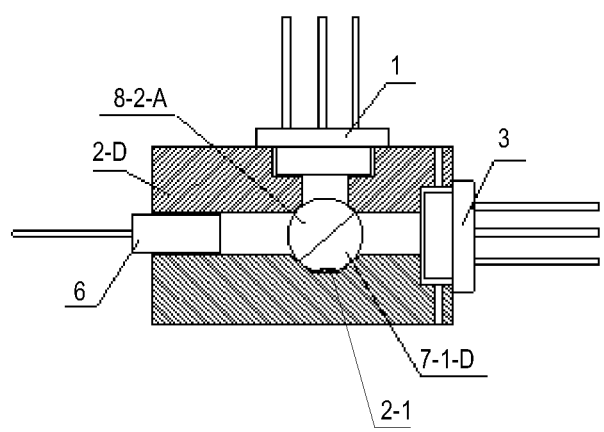
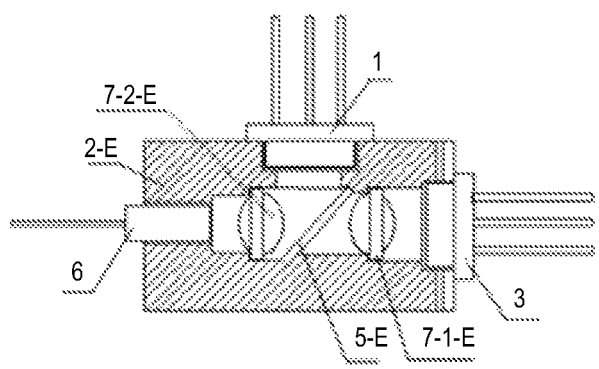

BI-DIRECTIONAL FIBER OPTIC TRANSCEIVERS, HOUSINGS THEREFOR, AND METHODS FOR MAKING AND USING THE SAME

CROSS REFERENCE TO RELATED APPLICATIONS

This application claims the benefit of Chinese Patent Application No. 201110177659.0, which was filed on Jun. 29, 2011, Chinese Patent Application No. 201110177660.3, also filed on Jun. 29, 2011, and Chinese Patent Application No. 201110338123.2, which was filed on Oct. 31, 2011, all of which are incorporated by reference as if fully set forth herein.

FIELD OF THE INVENTION

The present invention generally relates to optical transceivers, housings therefor and methods of making optical transceivers (e.g., using the housings).

DISCUSSION OF THE BACKGROUND

Most conventional communication is enabled via optical fiber or twisted-pair cable. Specifically, communication via optical fiber is characterized by a long transmission distance, low distortion, anti-disturbance, etc., while communication via twisted-pair cable is characterized by simple accessing, good compatibility with other apparatus, etc. Optical fiber transceivers are provided with characteristics of both of the above-mentioned modes of communication, so that the two modes can be converted to each other. The optical transceiver is a key subassembly for optical fiber transceivers and is configured to enable inter-conversion between light and electricity. Therefore, the performance of an optical transceiver has a direct impact on the whole transceiver and determines parameters of the transceiver such as communication distance, signal rate, error rate, etc. In a conventional bi-directional fiber optic transceiver, a wave separator or splitter is mounted at a 45-degree angle between a laser diode and the fiber, and the laser diode converts electronic signals into optical signals, which are provided to the fiber via the wave separator or splitter. Input optical signals from the fiber are reflected by the wave separator or splitter, and then are received along the input optical path by a photodiode configured to convert optical signals into electronic signals. The light from the laser diode has an emission angle which is larger than the acceptance angle of a fiber with low aperture value. As a result, if such laser diode and fiber are directly coupled, it causes serious energy loss. Therefore, how to couple the emission power of the optical source to the fiber in an optical transmitter for transmission is significant.

As FIG. 1 shows, in order to solve this problem and increase coupling efficiency, a lens 400 is mounted between laser diode 300 and fiber 600. Laser diode 300 modulates an electronic signal into one that has no inclined ray when it goes through lens 400. This process is characterized by a low imaging difference, high coupling rate, short focal length and low cost. Additionally, divergent beams from a light-emitting diode can be changed into convergent beams or collimated beams using lens 400. The optical source and fiber in a bi-directional fiber optic transceiver can have high coupling efficiency, with emitted light from laser diode 300 converging on lens 400. Generally, lens 400 is mounted between laser diode 300 and wave separator or splitter 500 in the direction of laser diode 300 in the optical transceiver so as to increase the coupling ratio of laser diode 300 and fiber 600. In addition, a hemispherical lens at a surface of photodiode 100 plays a role in short focus to increase the coupling ratio between photodiode 100 and fiber 600. However, in this way, the optical transceiver has a larger size, so that the structural dimensions of the bi-directional optical fiber subassembly in a slightly larger size is incompatible with an SFP+ profile in a smaller housing.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to provide a bi-directional fiber optic transceiver and housing therefor with high coupling efficiency and a small housing outline.

In order to implement the above-mentioned purposes, the present invention includes: a bi-directional fiber optic transceiver comprising a laser diode, a photodiode, a first lens, a second lens, and optionally, an optical splitter between the first lens and the second lens, wherein the first lens, second lens, laser diode, and photodiode share a common, linear optical axis. In various embodiments, the optical splitter is plated or coated with a first transmission increasing film and a first reflection increasing film; the first lens is plated or coated with a second transmission increasing film, while the second lens is plated or coated with a third transmission increasing film or an anti-reflection film; and/or at least one of the first and second lenses is an aspheric lens.

According to embodiments of the present invention, the surface of the optical splitter that corresponds to or faces the laser diode is plated or coated with the first transmission increasing film, and/or the surface of the optical splitter that corresponds to or faces the photodiode is plated or coated with the first reflection increasing film.

According to one embodiment of the present invention, the surface of the second lens relative to or facing the laser diode is plated or coated with the third transmission increasing film. According to one embodiment of the present invention, the surface of the first lens relative to or facing the photodiode is plated or coated or coated with a second reflection increasing film.

According to one embodiment of the present invention, the optical splitter is at a 45-degree angle to the optical path (e.g., the common linear optical axis).

According to one embodiment of the present invention, the first and second lenses are the same type.

According to one embodiment of the present invention, the first and second lenses are hemispherical lenses.

According to one embodiment of the present invention, the first and second hemispherical lenses and the optical splitter are combined as a sphere, while ends thereof (e.g., the flat, circular surfaces) are bonded to each other using an adhesive. According to one embodiment of the present invention, the first and second hemispherical lens are combined as a sphere, and there is a 45-degree angle between the flat faces of the first and second hemispherical lenses and the optical axis.

According to one embodiment of the present invention, the lower end of the first hemispherical lens has a locating slot.

According to one embodiment of the present invention, the first and second hemispherical lenses and opposite ends or sides of the optical splitter are held together by an adhesive.

According to one embodiment of the present invention, the laser diode is at the focal point of the first lens, and the photodiode is at the focal point of the second lens.

According to one embodiment of the present invention, the optical splitter is between the first and second hemispherical lenses, whose flat surfaces vertically flank the optical splitter.

According to one embodiment of the present invention, the first and second hemispherical lenses are fixed to opposite ends of the optical splitter via a rectangular framework. According to a further embodiment of the present invention, the optical splitter is oriented at 45 degrees on the diagonal of the framework, and the flat surfaces of the first and second hemispherical lenses vertically flank the rectangular framework. According to an alternative embodiment of the present invention, neither end of the optical splitter contacts the first or second hemispherical lenses, and the flat surfaces of the first and second hemispherical lenses vertically flank the optical splitter.

According to one embodiment of the present invention, the first and second lenses are spherical lenses. According to a further embodiment of the present invention, the first and second spherical lenses flank the optical splitter.

According to one embodiment of the present invention, the optical splitter is oriented in the optical path at a predetermined angle.

According to one embodiment of the present invention, the first and second lenses are aspheric lenses.

In one embodiment, neither end of the optical splitter contacts the first or second aspheric lens, and each of the first and second aspheric lenses has a flat surface that vertically flanks the optical splitter.

According to one embodiment of the present invention, the first lens is a spherical lens, and the second lens is an aspheric lens. Alternatively, the first lens is an aspheric lens, and the second lens is a spherical lens.

According to one embodiment of the present invention, the first spherical lens is on one side of the optical splitter and a surface of the second aspheric lens is positioned vertically on another side of the optical splitter. Alternatively, the first aspheric lens is on one side of the optical splitter and the surface of the second spherical lens is positioned vertically on the other side of the optical splitter.

According to one embodiment of the present invention, the laser diode is placed at the focal point of the first aspheric lens, and the photodiode is placed at the focal point of the second spherical lens.

Alternatively, the present invention provides a housing for the bi-directional fiber optic transceiver, comprising a laser diode mounting hole, a photodiode diode mounting hole and a fiber mounting hole, wherein the housing has an internal cavity corresponding to the first and second lenses and the optical splitter.

The present housing may further comprise a mounting slot with an inverted platform structure on a bottom surface of the cavity.

According to one embodiment of the present invention, either flank of the mounting slot has and/or may be oriented at a 45-degree angle.

According to one embodiment of the present invention, the upper walls of the cavity have fillets corresponding to the first and second hemispherical lenses.

According to one embodiment of the present invention, a locating piece configured to match the mounting slot on the lower end of the first hemispherical lens is on the lower surface of the mounting slot.

According to one embodiment of the present invention, the upper end of the mounting slot is higher than the lower end of the second hemispherical lens so that the lower end of the second hemispherical lens can be placed in the mounting slot.

Alternatively, the present invention provides a housing for the bi-directional fiber optic transceiver comprising a laser diode mounting hole, a photodiode diode mounting hole, a fiber mounting hole, and an internal cavity corresponding to the first and second lenses.

The present housing may further comprise an upper wall having a second bearing slot compatible with the upper end of the optical splitter.

According to one embodiment of the present invention, the lower wall of the cavity has a second bearing slot compatible with the lower end of the optical splitter.

The present invention further provides a method utilizing above-mentioned housing (e.g., to make the optical transceiver), comprising: placing first a hemispherical lens into a cavity of the optical transceiver through a photodiode mounting hole so as to orient a flat surface of the first hemispherical lens at a 45-degree angle, and inserting a locating piece into a mounting slot on the lower end of the first hemispherical lens; placing a flat surface of a second hemispherical lens onto the flat surface of the first hemispherical lens; and applying an adhesive to opposite ends of the first and second hemispherical lenses so as to fasten the first and second hemispherical lenses to the housing.

The present housing may further comprise an upper wall having fillets corresponding to the first and second hemispherical lenses.

According to one embodiment of the present invention, the cavity has v-shaped slots configured to match upper and lower ends of the optical splitter.

The present invention provides another method of making an optical transceiver, comprising: placing first and second hemispherical lenses in a cavity of a housing of the optical transceiver through a photodiode mounting hole, plumbing flat surfaces of first and second hemispherical lenses, and adhering ends of the first and second hemispherical lenses to the housing using an adhesive; placing an optical splitter at a 45-degree angle between the first and second hemispherical lenses, the optical splitter being in contact with both the first and second hemispherical lenses; and adhering ends or surfaces of the optical splitter to the first and second hemispherical lenses using a second adhesive.

The present invention further provides another method of making an optical transceiver, comprising: (1) placing a first hemispherical lens into a cavity of a housing of the optical transceiver through a photodiode mounting hole such that a flat surface of the first hemispherical lens is at a 45-degree angle, and a mounting slot in a lower end of the first hemispherical lens is inserted into a locating piece in the housing; (2) placing a flat surface of a second hemispherical lens onto the flat surface of the first hemispherical lens; and (3) applying an adhesive to ends of the first and second hemispherical lenses so as to tightly fix the first and second hemispherical lenses to the housing.

The present invention further provides another method of making an optical transceiver, comprising: (1) placing a first hemispherical lens into a cavity of a housing of the optical transceiver through a photodiode mounting hole such that a flat surface of the first hemispherical lens is at a 45-degree angle, and a mounting slot in the lower end of the first hemispherical lens is inserted into a locating piece in the housing; (2) placing an optical splitter onto the flat surface of the first hemispherical lens, and placing a flat surface of a second hemispherical lens onto the optical splitter; and (3) applying an adhesive to ends of the optical splitter, and to the first and second hemispherical lenses so as to tightly fix the optical splitter, and the first and second hemispherical lenses to the housing.

The present invention further provides another housing for the bi-directional fiber optic transceiver according to the present invention, comprising: a laser diode mounting hole, a photodiode mounting hole and a fiber mounting hole, wherein the housing has an internal cavity with a rectangular framework and first and second hemispherical lenses, and the cavity has upper and lower walls with fillets thereon relative to the first and second hemispherical lenses.

The present invention further provides another method of making an optical transceiver, comprising: placing first and second hemispherical lenses into a cavity of the optical transceiver through a photodiode mounting hole, plumbing flat surfaces of the first and second hemispherical lenses, and adhering ends of the first and second hemispherical lenses to a housing of the optical transceiver using an adhesive; placing a framework between the first and second hemispherical lenses which flank the framework; and placing the optical splitter at a 45-degree angle on a diagonal of the framework.

The present invention provides a further method for making an optical transceiver, comprising: placing first and second hemispherical lenses in a cavity of the optical transceiver through a photodiode mounting hole, plumbing flat surfaces of the first and second hemispherical lenses, and adhering ends of the first and second hemispherical lenses to a housing of the optical transceiver using an adhesive; and placing an optical splitter at a 45-degree angle within the cavity to lock upper and lower ends of the optical splitter in v-shaped slots in the housing.

According to one embodiment of the present invention, the distance between the upper and lower walls of the cavity is larger than or equal to the diameters of the first and second hemispherical lenses.

In a further embodiment, a method of making an optical transceiver may comprise: placing first and second hemispherical lenses in circular slots at a bottom of a cavity of a housing of the transceiver through a photodiode mounting hole, and adhering lower ends of the first and second hemispherical lenses to the housing using an adhesive; and placing an optical splitter at a 45-degree angle within the cavity, wherein upper and lower ends of the optical splitter are in the v-shaped slots in the housing.

The present invention further provides a method of making an optical transceiver, comprising: placing a first aspheric lens through a laser diode mounting hole in a cavity of a housing for the optical transceiver, plumbing a flat surface of the first aspheric lens, and adhering the first aspheric lens to the housing using a first adhesive; placing a second aspheric lens through a photodiode mounting hole in the cavity, plumbing a flat surface of the second aspheric lens, and adhering the second aspheric lens to the housing using a second adhesive; and placing an optical splitter in the cavity, while fixing the upper and lower ends of the optical splitter to a second bearing slot in the housing.

The present housing may comprise a cavity corresponding to the optical splitter, an aspheric lens and a spherical lens, wherein the housing has a lower wall having a first bearing slot compatible with the spherical lens.

According to one embodiment of the present invention, the cavity has upper and lower walls with second bearing slots compatible with upper and lower ends of the optical splitter.

The present invention provides another method of making an optical transceiver, comprising: placing a spherical lens through a photodiode mounting hole in a cavity of a housing of the optical transceiver; placing an aspheric lens through the photodiode mounting hole in the cavity, plumbing a flat surface of the aspheric lens, and adhering the aspheric lens to the housing using an adhesive; and placing an optical splitter between the spherical and aspheric lenses in the cavity so that an upper end of the optical splitter is fastened to the second bearing slot in the upper wall of the cavity, and the lower end is fastened to the first bearing slot in the lower wall of the cavity.

The present housing may comprise a cavity corresponding to an optical splitter, an aspheric lens and an spherical lens, a lower wall of the cavity having a first bearing slot compatible with the first spherical lens.

The present invention provides another method of making an optical transceiver, comprising: placing a spherical lens through a photodiode mounting hole in a cavity of a housing of the optical transceiver and adhering a lower end of the spherical lens to the housing using a first adhesive; placing an aspheric lens in the cavity through a laser diode mounting hole, plumbing a flat surface of the aspheric lens, and adhering ends of the aspheric lens to the housing using a second adhesive; subsequently, placing an optical splitter between the spherical lens and the aspheric lens in the cavity, and fasten an upper end of the optical splitter to the second bearing slot on the upper wall of the cavity, and fixing the lower end to the second bearing slot on the lower wall of the cavity.

Relative to existing technologies, the present invention has the following advantages: the lens and the hemispherical end face located at or facing a photodiode in existing technology are replaced by a hemispherical lens or spherical lens facing towards a laser diode based on embodiments of the present invention. Thus, the size of the transceiver towards the laser diode end (or the photodiode) can be reduced so that a circuit board of the original size can accommodate more optical transceivers or components thereof, or a similarly configured optical transceiver board can be smaller so as to reduce the size of the whole optical device. In embodiments of the present invention, utilizing a hemispherical lens or a spherical lens to focus the optical signal greatly increases the coupling ratio of optical links between the photodiode, the fiber and the laser diode. Additionally, an aspheric lens has advantages in the elimination of spherical aberration, coma aberration and/or other negative factors generated in optical transmissions, which can increase optical power output. The requirement of high power output can be served by utilizing the aspheric lens with high coupling in the present invention, and products with high output power can operate properly if an aspheric lens is used in the optical transceiver. With a spherical lens capable of extending the focal length, and the cooperation of an aspheric lens and the spherical lens, LD TO assemblies in individual housings can be enabled to serve as the housing for various products.

These and other advantages of the present invention will become readily apparent from the detailed description of various embodiments below.

BRIEF DESCRIPTION OF THE DRAWINGS

FIG. 7 is a block diagram showing embodiment V of the present invention.

FIG. 8 is a block diagram showing embodiment VI of the present invention.

FIG. 9 is a block diagram showing embodiment VII of the present invention.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "locating slot," "locating piece," and "mounting piece" are generally used interchangeably herein, but are generally given their art-recognized meanings. Also, for convenience and simplicity, the terms "wave separator" and "optical splitter" may be used interchangeably, as may the terms "anti-reflection film" and "transmission increasing film," and the terms "spherical" and "ball." Further, the terms "slot," "mounting slot," "bearing slot" and "v-shaped slot" are used somewhat interchangeably herein, but are generally given their art-recognized meanings, as are "circular slot, "depression" and "fillet."

The invention, in its various aspects, will be explained in greater detail below with regard to exemplary embodiments. The present invention will become readily apparent from the detailed description of such embodiments and the drawings that follows.

An Exemplary Bi-Directional Fiber Optic Transceiver

Figure 1:
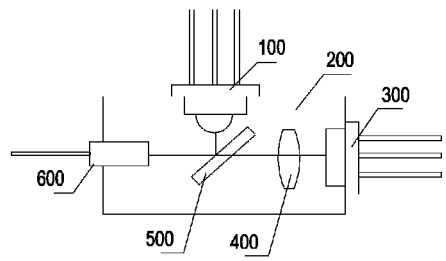
FIG. 1 is a block diagram showing a bi-directional fiber optic transceiver in accordance with existing technology.
Figure 2:
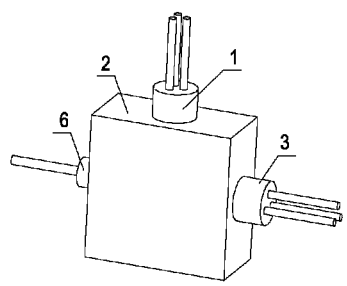
FIG. 2 is an outline diagram in accordance with the present invention.
Figure 3:
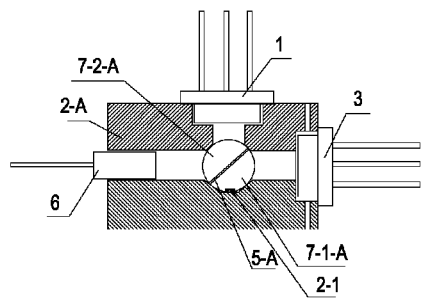
FIG. 3 is a block diagram showing embodiment I of the present invention.

An exemplary bi-directional fiber optic transceiver of the present invention generally comprises a laser diode, an optical splitter, a photodiode, and first and second lenses which flank the optical splitter (see, e.g., laser diode 3, optical splitter 5, photodiode 1, first lens 7-1-A and second lens 7-2-A of FIGS. 2-3). The surface of the optical splitter that corresponds to or faces the laser diode and/or a surface of the second lens relative to or facing the laser diode is plated or coated with a transmission increasing film. With the transmission increasing film, incident light reflected by either surface of the transmission increasing film may cancel each other to decrease reflected optical energy and increase transmission optical energy. The surface of the optical splitter that corresponds to or that faces the photodiode and/or the surface of the first lens relative to or facing the photodiode is plated or coated with a reflection increasing film. The reflection increasing film works in a way contrary to the transmission increasing film (i.e., incident light reflected by either surface of the reflection increasing film overlays, superimposes or constructively interferes with the light reflected by the other surface and is enhanced). Thus, transmission light fades or is reduced so that the transmission optical energy decreases and reflected optical energy increases.

Generally, the anti-reflection coating film can be selected from $MgF_2$, $TiO_2$, ceramic IR transmission increasing films, certain vinyl-substituted silsesquioxane hybrid membranes, etc. Typically, the reflection coating film can be selected from zinc chalcogenides, such as ZnSe, ZnS, and ZnO, possibly other vinyl-substituted silsesquioxane hybrid membranes, etc. Conventional film coating methods include vacuum evaporation, chemical vapor deposition, sol-gel coating, etc. Sol-gel coating advantageously uses less expensive apparatus and/or less equipment, and it can be operated at ambient temperatures and pressures. In addition, sol-gel coating advantageously provides high uniformity of coating, a controllable microstructure, an optical thin film with a high laser damage threshold (e.g., via recipe and preparation process control), and compatibility with substrates of different shapes and sizes. In the present invention, both surfaces of an optical splitter can be coated via sol-gel coating.

The first lens, second lens, laser diode and photodiode share a common optical axis. Therefore, the longitudinal dimension of the transceiver can be decreased, and transmissions in the optical path can be optimized with minimal optical loss.

More specifically, the first and second lenses in the present invention can be spherical, hemispherical and/or aspheric lenses.

FIG. 2 generally shows an exterior view of the bi-directional fiber optic transceiver of the present invention, comprising photodiode 1, housing 2, laser diode 3 and fiber 6. The internal components and details of the bi-directional fiber optical receiver are described more specifically in the various embodiments below, which embodiments also make reference to FIG. 2.

An exemplary process for making a spherical lens in accordance with the present invention includes: (1) rounding off the edges of a cube which subsequently becomes a spheroid; (2) placing the spheroid in a grinder (e.g., a ball grinder) for rough grinding, and subsequently, based on various requirements, adding grinding materials to the grinder, which may have plates with homocentric slots to accommodate the spheroids, in which the spheroids and the plates run in relative motion to grind the spheroids; (3) polishing the spheroids (e.g., glass balls) with a flexible polishing mold which can change its surface shape in accordance with the finished surface of the spheroid so as to decrease the roughness of the surface of the spheroid, instead of changing the surface shape of the finished surface.

An exemplary process for making a hemispherical lenses in accordance with the present invention includes: (1) rounding off the edges of a cube which subsequently becomes a spheroid; (2) placing the spheroid in a grinder (e.g., a ball grinder) for rough grinding, and subsequently, based on various requirements, adding grinding materials to the grinder, which may have plates with homocentric slots to accommodate the spheroids, in which the spheroids and the plates run in relative motion to grind the spheroids; (3) polishing the spheroids (e.g., glass balls) with a flexible polishing mold which can change its surface shape in accordance with the finished surface of the spheroid so as to decrease the roughness of the surface of the spheroid, instead of changing the surface shape of the finished surface, and then cutting the polished spheroids into equal halves for cut surface processing and/or forming of the hemispherical lenses.

An exemplary process for making an aspheric lens in accordance with the present invention includes: (1) melting a piece of optical glass down, and pouring the optical glass in a molten state into a compression mold (which may be made from a special material), and then heating the glass and mold up to the softening point of the glass in absence of oxygen, and subsequently pressing the glass with the mold when the glass and mold are roughly at the same temperature; (2) then, with constant applied pressure, cooling the mold down to make its temperature go below the softening point of the glass, and while cooling the mold down, taking the fashioned aspheric lens from the mold.

Embodiment I

Figure 12:
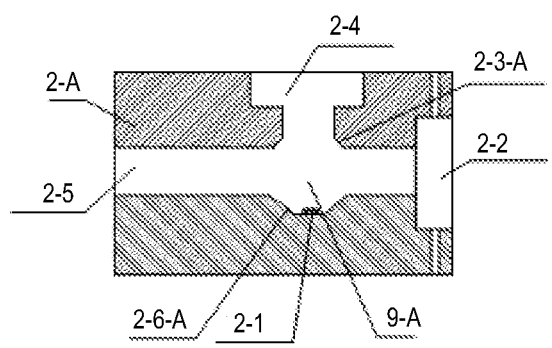
FIG. 12 is a block diagram showing the housing in embodiments I and VI of the present invention.

FIG. 2 generally shows an exterior view of the bi-directional fiber optic transceiver of the present invention, comprising a photodiode 1, a laser diode 3, a fiber 6 and a housing 2. As FIGS. 2 and 3 show, a first embodiment of the bi-directional fiber optic transceiver of the present invention comprises a first hemispherical lens 7-1-A, a second hemispherical lens 7-2-A, and an optical splitter 5-A at a 45-degree angle with regard to the optical path. First hemispherical lens 7-1-A and second hemispherical lens 7-2-A combine to form a spheroid. Laser diode 3 is placed at the focal point of first hemispherical lens 7-1-A, and the photodiode 1 is placed at the focal point of second hemispherical lens 7-2-A. A locating slot 2-1 is below the first hemispherical lens 7-1-A. Housing 2-A for the optical transceiver (see FIGS. 3 and 12) comprises a laser diode mounting hole 2-2, a photodiode mounting hole 2-4, a fiber mounting hole 2-5 and an internal cavity 9-A corresponding to the optical splitter 5-A and the hemispherical lenses 7-1-A, 7-2-A. A bottom surface of the cavity 9-A has a mounting slot 2-6-A with an inverted platform structure. Either flank of the mounting slot 2-6-A may have a 45-degree angle with regard to the bottom surface of the cavity 9-A parallel to the optical axis, but other angles (e.g., from 30° to 60°) may be suitable as well. Upper walls of cavity 9-A have fillets 2-3-A corresponding to the first hemispherical lens 7-1-A and the second hemispherical lens 7-2-A. The angles of the fillets 2-3-A may be from 30° to 60° (e.g., about 45°). A lower surface of the mounting slot 2-6-A and the locating piece 2-1 are configured to match and secure the lower end of the first hemispherical lens 7-1-A. Also, an inclined surface of the first hemispherical lens 7-1-A facing towards the laser diode 3 and the photodiode 1 can be ensured. In order to prevent the first hemispherical lens 7-1-A and the second hemispherical lens 7-2-A from departing from the housing 2-A, and to maintain the quality of the optical transceiver, the upper end of the mounting slot 2-6-A must be higher than the lower end of second hemispherical lens 7-2-A. Therefore, the lower end of hemispherical lens 7-2-A can be mounted within mounting slot 2-6-A to enable the lower end of hemispherical lens 7-2-A to contact housing 2-A.

The first hemispherical lens 7-1-A is placed in the cavity 9-A through the photodiode mounting hole 2-4 so that the flat surface of the first hemispherical lens 7-1-A has a 45-degree angle with regard to the optical axis. The mounting slot on the lower end of the first hemispherical lens 7-1-A is inserted in the mounting piece 2-1. Then, the optical splitter 5-A is placed on the flat surface of the first hemispherical lens 7-1-A, to which is obliquely added or placed the flat surface of second hemispherical lens 7-2-A. Finally, an adhesive is applied to ends of the first hemispherical lens 7-1-A, the second hemispherical lens 7-2-A and the optical splitter 5-A to fasten the optical splitter 5-A, the first hemispherical lens 7-1-A and the second hemispherical lens 7-2-A to the housing 2-A.

Embodiment II

Figure 4:
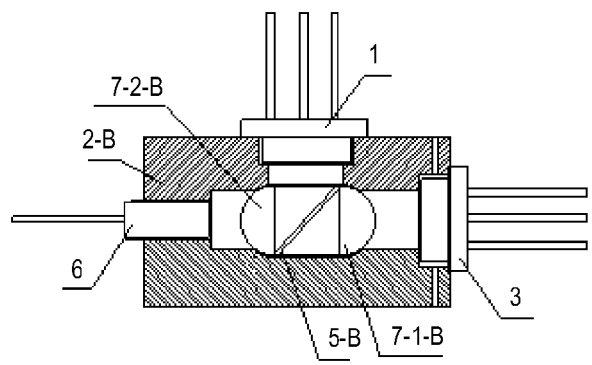
FIG. 4 is a block diagram showing embodiment II of the present invention.

As FIGS. 2 and 4 show, a second embodiment of the bi-directional fiber optic transceiver of the present invention comprises a first hemispherical lens 7-1-B, a second hemispherical lens 7-2-B, and an optical splitter 5-B that has a 45-degree angle with regard to the optical path. Planar surfaces of the first hemispherical lens 7-1-B and the second hemispherical lens 7-2-B vertically flank the optical splitter 5-B. Ends of the optical splitter 5-B may be adhered to the first hemispherical lens 7-1-B and the second hemispherical lens 7-2-B with an adhesive. The laser diode 3 is placed at the focal point of the first hemispherical lens 7-1-B, and the photodiode 1 is placed at the focal point of second hemispherical lens 7-2-B.

Figure 13:
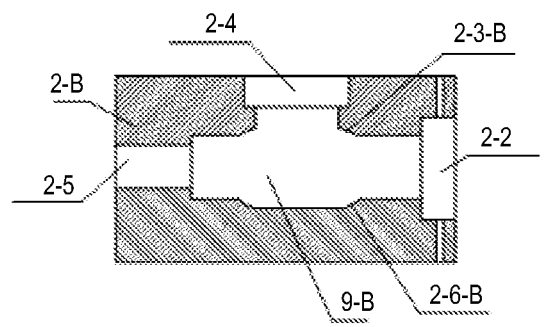
FIG. 13 is a block diagram showing the housings in embodiments II and III of the present invention.

Housing 2-B of the optical transceiver (FIG. 13) comprises a laser diode mounting hole 2-2, a photodiode mounting hole 2-4 and an internal cavity 9-B corresponding to the optical splitter 5-B and the hemispherical lenses 7-1-B and 7-2-B. Lower walls of the cavity 9-B have fillets 2-6-B corresponding to the first hemispherical lens 7-1-B and the second hemispherical lens 7-2-B, while upper walls have inverted fillets 2-3-B corresponding to the first hemispherical lens 7-1-B and the second hemispherical lens 7-2-B. The angles of the fillets 2-6-B and inverted fillets 2-3-B may be from 10° to 45° (e.g., about 30°). The first hemispherical lens 7-1-B can be placed into the cavity 9-B through the photodiode mounting hole 2-4. The flat surfaces of the first and second hemispherical lenses 7-1-B, 7-2-B are then plumbed with the cavity 9-B of the housing 2-B, and ends of the first and second hemispherical lenses 7-1-B, 7-2-B are adhered to the housing 2-B using an adhesive. The optical splitter 5-B is placed at a 45-degree angle between the first and second hemispherical lenses 7-1-B, 7-2-B. The optical splitter 5-B is in contact with both of the first and second hemispherical lenses 7-1-B, 7-2-B. Ends of the optical splitter 5-B in contact with the first and second hemispherical lenses 7-1-B, 7-2-B may be adhered to the first and second hemispherical lenses 7-1-B, 7-2-B using the same or a different adhesive.

Embodiment III

Figure 5:
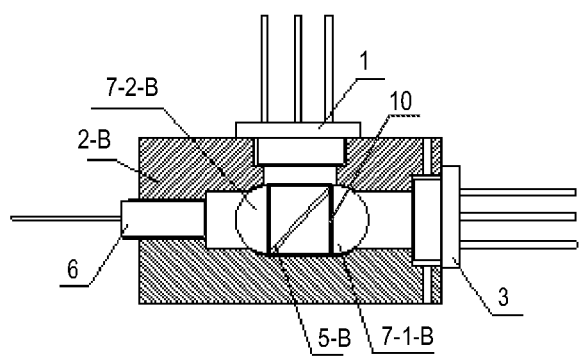
FIG. 5 is a block diagram showing embodiment III of the present invention.
Figure 16:
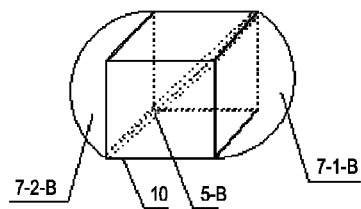
FIG. 16 is a block diagram showing the framework in embodiment III of the present invention.

Referring to FIGS. 2, 5 and 16, a third embodiment of the bi-directional fiber optic transceiver of the present invention comprises a first hemispherical lens 7-1-B, a second hemispherical lenses 7-2-B, and an optical splitter 5-B at a 45-degree angle with regard to the optical path. The flat surfaces of first hemispherical lens 7-1-B and the second hemispherical lens 7-2-B vertically flank the optical splitter 5-B. Ends of the optical splitter 5-B are fixed to the first hemispherical lens 7-1-B and the second hemispherical lens 7-2-B via a rectangular framework (see rectangular framework 10 in FIG. 16), wherein the laser diode 3 is placed at the focal point of the first hemispherical lens 7-1-B, and the optical splitter 5-B is placed at the focal point of the second hemispherical lens 7-2-B.

Housing 2-B of the optical transceiver (FIG. 13) comprises a laser diode mounting hole 2-2, a photodiode mounting hole 2-4, a fiber mounting hole 2-5 and an internal cavity 9-B corresponding to the optical splitter 5-B and the hemispherical lenses 7-1-B and 7-2-B. Lower walls of the cavity 9-B have fillets 2-6-B corresponding to the first hemispherical lens 7-1-B and the second hemispherical lens 7-2-B, while upper walls have inverted fillets 2-3-B corresponding to first hemispherical lens 7-1-B and second hemispherical lens 7-2-B. The angle of the fillets 2-6-B and the inverted fillets 2-3-B may be from 10° to 45° (e.g., about 30°). The first hemispherical lens 7-1-B can be placed into the cavity 9-B through the photodiode mounting hole 2-4. Flat surfaces of the first and second hemispherical lenses 7-1-B, 7-2-B are then plumbed with the cavity 9-B and the housing 2-B, and ends of the first and second hemispherical lenses 7-1-B, 7-2-B are adhered to housing 2-B using an adhesive. The framework 10 is placed between the first and second hemispherical lenses 7-1-B, 7-2-B which flank the framework 10. The optical splitter 5-B is in contact with and at a 45-degree angle on a diagonal of framework 10.

Embodiment IV

Figure 6:
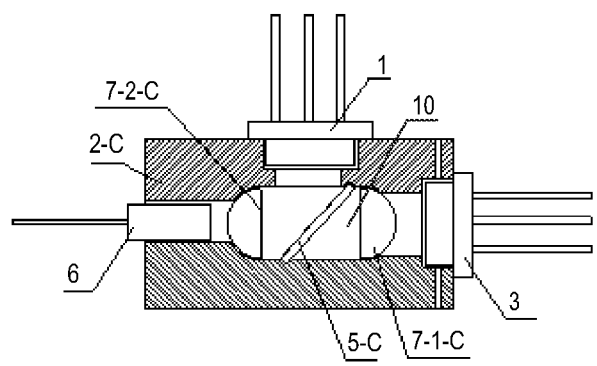
FIG. 6 is a block diagram showing embodiment IV of the present invention.

Referring to FIGS. 2 and 6, a fourth embodiment of the bi-directional fiber optic transceiver of the present invention comprises a first hemispherical lens 7-1-C, a second hemispherical lenses 7-2-C and an optical splitter 5-C at a 45-degree angle with regard to the optical path. Flat surfaces of the first hemispherical lens 7-1-C and the second hemispherical lens 7-2-C vertically flank the optical splitter 5-C. Neither end of the optical splitter 5-C is in contact with the first hemispherical lens 7-1-C or the second hemispherical lenses 7-2-C. The laser diode 3 is placed at the focal point of the first hemispherical lens 7-1-C, and the optical splitter 5-C is placed at the focal point of the second hemispherical lens 7-2-C.

Figure 14:
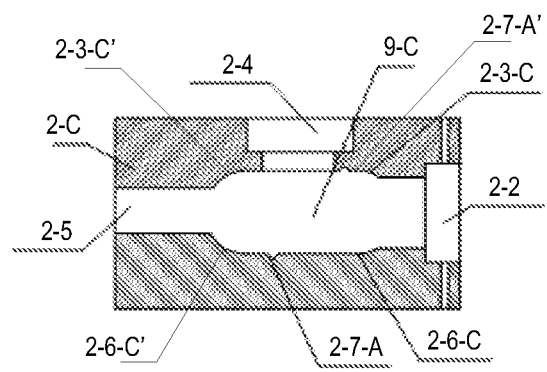
FIG. 14 is a block diagram showing the housing in embodiment IV of the present invention.

Housing 2-C of the optical transceiver (FIG. 14) comprises a laser diode mounting hole 2-2, a photodiode mounting hole 2-4, a fiber mounting hole 2-5 and an internal cavity 9-C corresponding to the optical splitter 5-C and the hemispherical lenses 7-1-C and 7-2-C. A lower wall of cavity 9-C has fillets 2-6-C and 2-6-C' corresponding, respectively, to the first hemispherical lens 7-1-C and the second hemispherical lens 7-2-C. The upper wall of cavity 9-C has fillets 2-3-C and 2-3-C' configured, respectively, to match the first hemispherical lens 7-1-C and the second hemispherical lens 7-2-C. The angle of the fillets 2-3-C, 2-3-C', 2-6-C and 2-6-C' may be from 10° to 45° (e.g., about 30°). First v-shaped slot 2-7-A in the lower wall is configured to match a lower end of the optical splitter 5-C. Second v-shaped slot 2-7-A' is configured to match the upper end of optical splitter 5-C. The first hemispherical lens 7-1-C and second hemispherical lens 7-2-C can be placed in cavity 9-C through the photodiode mounting hole 2-4. The flat surfaces of first and second hemispherical lenses 7-1-C, 7-2-C are then plumbed within the cavity 9-C and the housing 2-C, and the ends of the first and second hemispherical lenses 7-1-C, 7-2-C are adhered to the housing 2-C using an adhesive. The optical splitter 5-C is placed at a 45-degree angle between the first and second hemispherical lenses 7-1-C, 7-2-C within cavity 9-C to lock a lower end of optical splitter 5-C into a first v-shaped slot 2-7-A and an upper end of the optical splitter 5-C in second v-shaped slot 2-7-A'.

Embodiment V

Figure 15:
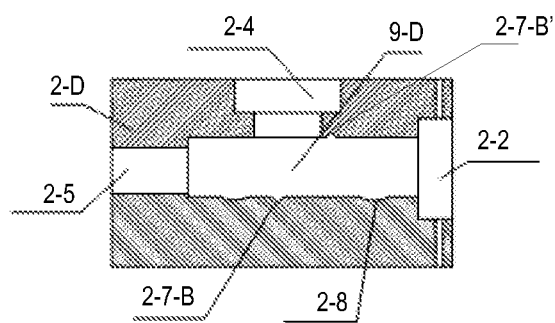
FIG. 15 is a block diagram showing the housing in embodiment V of the present invention.

Referring to FIGS. 2 and 7, a fifth embodiment of the bi-directional fiber optic transceiver of the present invention comprises a first spherical lens 8-1-A, a second spherical lens 8-2-A and an optical splitter 5-D between the first and second spherical lenses at a 45-degree angle with respect to the optical path. The laser diode 3 is placed at the focal point of the first spherical lens 8-1-A, and the optical splitter 5-D is placed at the focal point of the second spherical lens 8-2-A. Fiber 6 is mounted closer to a lower wall of a cavity 9-D (see FIGS. 7 and 15) than an upper wall of the cavity 9-D, and the laser diode 3 is mounted such that a greater portion of the laser diode 3 is below the lower wall of the cavity 9-D than is above the upper wall of cavity 9-D.

Housing 2-D of the optical transceiver (FIG. 15) comprises a laser diode mounting hole 2-2, a photodiode mounting hole 2-4, a fiber mounting hole 2-5 and an internal cavity 9-D corresponding to the optical splitter 5-D and the spherical lenses 8-1-A and 8-2-A. The lower wall of the cavity 9-D has fillets 2-8 corresponding to the first spherical lens 8-1-A and the second spherical lens 8-2-A, and a first v-shaped slot 2-7-B is configured to match a lower end of the optical splitter 5-D. The arc length of the fillets 2-8 may be from 15° to 60° (e.g., about 30°). The upper wall of the cavity 9-D has a second v-shaped slot 2-7-B' configured to match an upper end of optical splitter 5-D. The distance between the upper and lower walls of the cavity 9-D may be greater than or equal to the diameter of the first spherical lens 8-1-A and the second spherical lens 8-2-A so that the first and second spherical lens 8-1-A, 8-2-A can be mounted in the cavity 9-D. The first spherical lens 8-1-A and second spherical lens 8-2-A are placed in cavity 9-D through the photodiode mounting hole 2-4. Surfaces of the first and second spherical lenses 8-1-A, 8-2-A are then plumbed within the cavity 9-D of the housing 2-D, and ends are adhered to housing 2-D using an adhesive. The optical splitter 5-D is placed at a 45-degree angle within the cavity 9-D to lock a lower end of the optical splitter 5-D in a first v-shaped slot 2-7-B and an upper end of optical splitter 5-D in second v-shaped slot 2-7-B'.

Embodiment VI

As FIGS. 2 and 8 show, a sixth embodiment of the bi-directional fiber optic transceiver of the present invention comprises a first hemispherical lens 7-1-D and a second hemispherical lens 7-2-D. The flat surfaces of first and second hemispherical lenses 7-1-D and 7-2-D are at a 45-degree angle with regard to the optical axis. The first hemispherical lens 7-1-D and second hemispherical lens 7-2-D are combined as a sphere. A locating slot 2-1 is below a bottom of first hemispherical lens 7-1-D. Housing 2-A for the optical transceiver (FIG. 12) comprises a laser diode mounting hole 2-2, a photodiode mounting hole 2-4, a fiber mounting hole 2-5 and an internal cavity 9-A corresponding to hemispherical lenses 7-1-D and 7-2-D. A bottom of the cavity 9-A has a mounting slot 2-6-A with an inverted platform structure. Either flank of the mounting slot 2-6-A has or may be oriented at a 45-degree angle. An upper wall of the cavity 9-A has fillets 2-3-A corresponding to the first hemispherical lens 7-1-D and the second hemispherical lens 7-2-D. The angles of the fillets 2-3-A may be from 30° to 60° (e.g., about 45°). A lower surface of the mounting slot 2-6-A has a locating piece 2-1 configured to match and secure a lower end of first hemispherical lens 7-1-D, such that an inclined surface of the first hemispherical lens 7-1-D facing toward the photodiode 1 can be ensured. In order to prevent the first hemispherical lens 7-1-D and the second hemispherical lens 7-2-D from departing from the housing 2-A and to maintain the quality of the optical transceiver, an upper end of mounting slot 2-6-A must be higher than a lower end of second hemispherical lens 7-2-D. Thus, the lower end of hemispherical lens 7-2-D can be placed in the mounting slot 2-6-A and secured.

First hemispherical lens 7-1-D is placed in the cavity 9-A through a photodiode mounting hole 2-4 so that the flat surface of first hemispherical lens 7-1-D has a 45-degree angle with respect to the optical axis. The mounting slot in the lower end of first hemispherical lens 7-1-D is inserted in the mounting piece 2-1. The flat surface of the second hemispherical lens 7-2-D is obliquely added or placed on the flat surface of the first hemispherical lens 7-1-D. Finally, an adhesive is applied to ends of the first hemispherical lens 7-1-D and the second hemispherical lens 7-2-D, to adhere the first hemispherical lens 7-1-D and the second hemispherical lens 7-2-D to housing 2-A.

Embodiment VII

Figure 17:
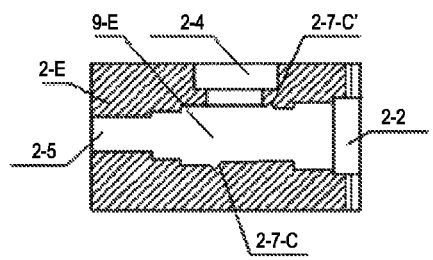
FIG. 17 is a block diagram showing the housing in accordance with embodiment VII of the present invention.

Referring to FIGS. 2 and 9, a seventh embodiment of the bi-directional fiber optic transceiver comprises a first aspheric lens 7-1-E, a second aspheric lens 7-2-E and an optical splitter 5-E at a 45-degree angle with regard to the optical path. Flat surfaces of the first aspheric lens 7-1-E and the second aspheric lens 7-2-E vertically flank the optical splitter 5-E, but do not contact the optical splitter 5-E. Laser diode 3 is placed at the focal point of the first aspheric lens 7-1-E, and the photodiode 1 is placed at the focal point of the second aspheric lens 7-2-E. Housing 2-E of the optical transceiver (FIG. 17) comprises a laser diode mounting hole 2-2, a photodiode mounting hole 2-4, a fiber mounting hole 2-5, and an internal cavity 9-E corresponding to the optical splitter 5-E and the aspheric lenses 7-1-E and 7-2-E. Upper and lower walls of cavity 9-E have bearing slots 2-7-C and 2-7-C' compatible, respectively, with lower and upper ends of the optical splitter 5-E. The bearing slots 2-7-C and 2-7-C' secure the optical splitter 5-E, and incline the optical splitter 5-E towards the laser diode 3 and the photodiode.

The second aspheric lens 7-2-E can be placed through the photodiode mounting hole 2-4 in the cavity 9-E. The flat surface of second aspheric lens 7-2-E is then plumbed within the cavity 9-E and the housing 2-E, and ends of the second aspheric lens 7-2-E are adhered to the housing 2-E using an adhesive. Subsequently, the first aspheric lens 7-1-E is placed through the laser diode mounting hole 2-2 in the cavity 9-E. The flat surface of the first aspheric lens 7-1-E is plumbed, and the ends of first aspheric lens 7-1-E are adhered to the housing 2-E using the same or different adhesive. The optical splitter 5-E is placed at a 45-degree angle (with regard to the optical path) between the first aspheric lens 7-1-E and the second aspheric lens 7-2-E in the cavity 9-E. Lower and upper ends of optical splitter 5 are fixed respectively, to bearing slots 2-7-C and 2-7-C'.

Embodiment VIII

Figure 10:
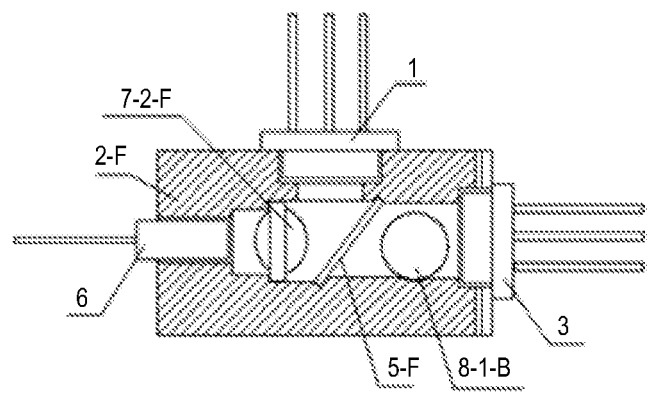
FIG. 10 is a block diagram showing embodiment VIII of the present invention.
Figure 18:
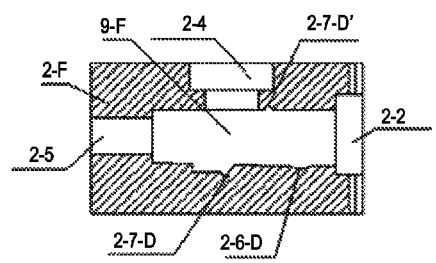
FIG. 18 is a block diagram showing the housing in accordance with embodiment VIII of the present invention.

Referring to FIGS. 2 and 10, an eighth embodiment of the bi-directional fiber optic transceiver of the present invention comprises a spherical lens 8-1-B, an aspheric lens 7-2-F and an optical splitter 5-F at a 45 or 60-degree angle with regard to the optical path. The spherical lens 8-1-B is mounted on one side of the optical splitter 5-F, while a flat surface of the aspheric lens 7-2-F is vertically mounted on the other side of optical splitter 5-F. The laser diode 3 is placed at the focal point of the spherical lens 8-1-B, and the photodiode 1 is placed at the focal point of the aspheric lens 7-2-F. Housing 2-F of the optical transceiver (FIG. 18) comprises a laser diode mounting hole 2-2, a photodiode mounting hole 2-4, an optical fiber mounting hole 2-5, and a cavity 9-F corresponding to first spherical lens 8-1-B, the second aspheric lens 7-2-F and the optical splitter 5-F. A lower wall of cavity 9-F has a first bearing slot 2-6-D compatible with the first spherical lens 8-1-B and a first (v-shaped) bearing slot 2-7-D compatible with a lower end of the optical splitter 5-F. The arc length of the first bearing slot may be from 15° to 60° (e.g., about 30°). Also, the upper wall of cavity has a second (v-shaped) bearing slot 2-7-D' compatible with an upper end of optical splitter 5-F.

The spherical lens 8-1-B can be placed through the photodiode mounting hole 2-4 into the first bearing slot 2-6-D on the lower wall of cavity 9-F, and a lower end of the spherical lens 8-1-B is adhered to housing 2-F using an adhesive. Subsequently, the aspheric lens 7-2-F is placed through the photodiode mounting hole 2-4 into the cavity 9-F, a flat surface of the aspheric lens 7-2-F is plumbed, and ends of the aspheric lens 7-2-F are adhered to the housing 2-F using the same or a different adhesive. The optical splitter 5-F is placed at a 45 or 60-degree angle (with regard to the optical path) between the spherical lens 8-1-B and the aspheric lens 7-2-F in cavity 9-F, while upper and lower ends of optical splitter 5-F are fixed to the second bearing slots 2-7-D' and 2-7-D on respectively, the upper and lower walls of cavity 9-F.

Embodiment IX

Figure 11:
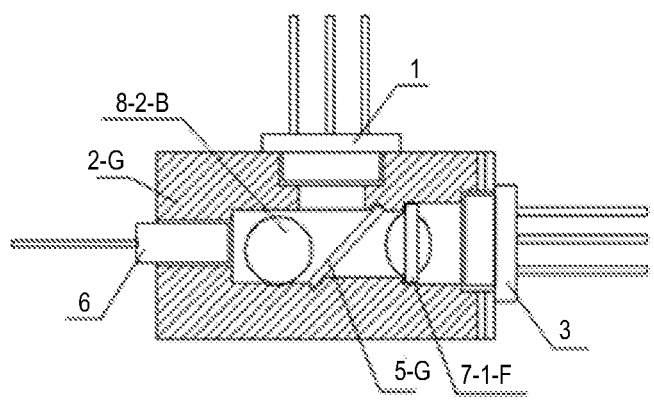
FIG. 11 is a block diagram showing embodiment IX of the present invention.
Figure 19:
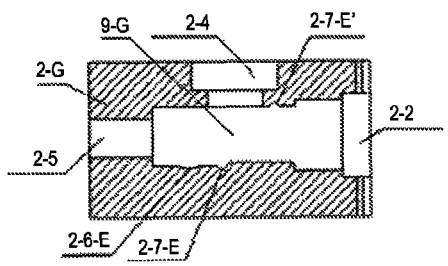
FIG. 19 is a block diagram showing the housing in accordance with embodiment IX of the present invention.

Referring to FIGS. 2 and 11, a ninth embodiment of the bi-directional fiber optic transceiver of the present invention comprises an aspheric lens 7-1-F, a spherical lens 8-2-B and an optical splitter 5-G at a 45-degree angle with regard to the optical path. The spherical lens 8-2-B is on one side of optical splitter 5-G, while a flat surface of the aspheric lens 7-1-F is positioned vertically on the other side of optical splitter 5-G. The laser diode 3 is placed at the focal point of the aspheric lens 7-1-F, and the photodiode 1 is placed at the focal point of the spherical lens 8-2-B. Housing 2-G of the optical transceiver (FIG. 19) comprises a laser diode mounting hole 2-2, a photodiode mounting hole 2-4 and an optical fiber mounting hole 2-5, and a cavity 9-G corresponding to the aspheric lens 7-1-E, the spherical lens 8-2-B and the optical splitter 5-G. A lower wall of cavity 9-G has a first bearing slot 2-6-E compatible with the spherical lens 8-2-B and a first (v-shaped) bearing slot 2-7-E compatible with a lower end of optical splitter 5-G. The first bearing slot 2-6-E may have an arc length of from 15° to 60° (e.g., 30°). Also, the upper wall of cavity has a second (v-shaped) bearing slot 2-7-E' compatible with an upper end of optical splitter 5-G.

The spherical lens 8-2-B is placed through the photodiode mounting hole 2-4 in first bearing slot 2-6-E on the lower wall of cavity 9-G, and the lower end of second spherical lens 8-2-B is adhered to housing 2-G using an adhesive. Subsequently, the aspheric lens 7-1-F is placed through the laser diode mounting hole 2-2 in cavity 9-G, the flat surface of first aspheric lens 8-2-B is plumbed, and the ends of the aspheric lens 8-2-B are adhered to housing 2-G using the same or different adhesive. The optical splitter 5-G is placed at a 45-degree angle (with regard to the optical path) between the spherical lens 8-2-B and the aspheric lens 7-1-F. Upper and lower ends of optical splitter 5-G are fixed respectively, to second bearing slots 2-7-E' and 2-7-E on the upper and lower walls of cavity 9-G.

Figure 20:
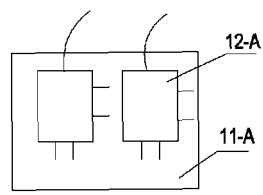
FIG. 20 is a diagram showing optical transceivers on a circuit board in accordance with existing technology.
Figure 21:
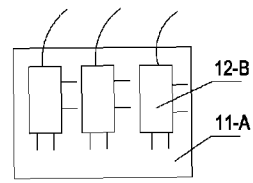
FIG. 21 is diagram I showing optical transceivers on a circuit board in accordance with the present invention.
Figure 22:
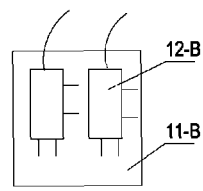
FIG. 22 is diagram II showing optical transceivers on a circuit board in accordance with the present invention.

Referring to FIG. 20, a conventional optical transceiver 12-A is soldered onto a circuit board 11-A, but the conventional transceiver 12-A has a relatively large size in the direction of the laser diode (or the photodiode), which results in less available space and/or positions for soldering additional transceivers 12-A on the circuit board. Referring now to FIGS. 21-22, with the improvements provided in accordance with the present invention, the outline of the optical transceiver 12-B in the direction of the laser diode or photodiode is decreased, while the amount of available space and positions for soldering additional transceivers 12-B on a circuit board 11-A is increased (see FIG. 21). Alternatively, without changing the original number of optical transceivers 12-B, the outline of the whole optical assembly can be decreased (see FIG. 22), which is also compatible with the minimum available soldering space and/or size for circuit board 11-B.

CONCLUSION/SUMMARY

Thus, the present invention advantageously provides bi-directional fiber optic transceivers using spherical, hemispherical and/or aspheric lenses, thereby reducing the size of the transceiver so that a circuit board can accommodate more optical transceivers and/or components thereof, or similarly configured optical transceivers can be smaller so as to reduce the size of the whole optical device. By utilizing a hemispherical lens or a spherical lens to focus the optical signal, the coupling ratio of optical links between the photodiode, fiber and laser diode is greatly increased. Additionally, using aspheric lenses has advantages in the elimination of spherical aberration, coma aberration, and/or other negative factors generated in optical transmissions, which can increase optical power output. The requirement of high power output can be served by utilizing the aspheric lens with high coupling in the present invention, and products with high output power can operate properly if an aspheric lens is used in the optical transceiver. With a spherical lens capable of extending the focal length, and the cooperation of an aspheric lens and the spherical lens, LD TO assemblies in individual housings can be enabled to serve as the housing for various products.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated or coated. It is intended that the scope of the invention be defined by the Claims appended hereto and their equivalents.

What is claimed is:

1. An optical transceiver, comprising:
   a) a laser diode;
   b) a photodiode;
   c) a first lens in an optical path of the optical transceiver;
   d) a second lens in the optical path of the optical transceiver, wherein the photodiode is at a focal point of the second lens;
   e) an optical splitter between the first lens and the second lens, having a first surface facing the laser diode, and a second surface facing the photodiode, wherein the first lens, the second lens, the laser diode, and the optical splitter share a common linear optical axis;
   f) a transmission increasing film on the first surface or the first lens;
   g) a reflection increasing film on the second surface or the second lens; and
   h) a housing with (i) a photodiode mounting hole configured to receive the photodiode and (ii) an internal cavity configured to house the first lens, the second lens and the optical splitter, wherein the housing has upper and lower walls defining the internal cavity, the upper wall has fillets at an interface with a passage between the internal cavity and the photodiode mounting hole, the fillets being configured to secure the second lens in place in the internal cavity, the lower wall has at least one slot or fillet configured to mount the first lens thereon, and a distance between the upper and lower walls is less than or equal to a diameter of each of the first and second lenses.

2. The optical transceiver of claim 1, wherein the first surface includes the transmission increasing film, and the second surface includes the reflection increasing film.

3. The optical transceiver of claim 2, wherein the optical splitter is at an angle of 45 degrees with respect to the optical axis.

4. The optical transceiver of claim 1, wherein the first and second lenses comprise hemispherical lenses.

5. The optical transceiver of claim 4, wherein the first and second hemispherical lenses form a sphere.

6. The optical transceiver of claim 5, wherein the lower wall comprises the slot, and the slot is below the first hemispherical lens.

7. The optical transceiver of claim 2, wherein the first and second lenses each have a flat surface that faces the optical splitter, and the flat surface of the second lens faces the laser diode and has a second transmission increasing film thereon.

8. The optical transceiver of claim 2, wherein the first and second lenses each have a flat surface that faces the optical splitter, and the flat surface of the first lens faces the photodiode and has a second reflection increasing film thereon.

9. The optical transceiver of claim 8, wherein the flat surface of the second lens faces the laser diode and has a second transmission increasing film thereon.

10. The optical transceiver of claim 1, wherein the housing further comprises a laser diode mounting hole configured to receive the laser diode.

11. The housing of claim 10, wherein the lower wall has an inverted platform structure.

12. The housing of claim 11, further comprising a locating piece on a lower surface of the slot or fillet, the locating piece being configured to match a complementary mounting slot in the first lens.

13. The optical transceiver of claim 1, wherein the lower wall has at least one slot configured to mount the first and second lenses in the internal cavity.

14. The optical transceiver of claim 1, wherein the housing further comprises a fiber mounting hole configured to receive an optical fiber, along the optical axis.

15. A housing for an optical transceiver, comprising:
  a) a laser diode mounting hole;
  b) a photodiode mounting hole;
  c) an optical fiber mounting hole; and
  d) an internal cavity configured to house a first lens, a second lens, and an optical splitter between the first and second lenses;
  wherein the housing has upper and lower walls defining the internal cavity, the upper wall has fillets at an interface with a passage between the internal cavity and the photodiode mounting hole, the fillets being configured to secure the second lens in place in the internal cavity, the lower wall has an inverted platform structure and at least one slot configured to mount the first lens thereon, the housing further includes a locating piece on a lower surface of the slot, the locating piece being configured to match a complementary mounting slot in the first lens, and the first and second lenses each have a diameter greater than a distance between the upper and lower walls.

16. The housing of claim 15, wherein the housing is configured so that the first lens, the second lens, a laser diode in the laser diode mounting hole, and the optical splitter share a common linear optical axis.

17. The housing of claim 16, wherein the optical splitter is at an angle of 45 degrees with respect to the optical axis.

18. The housing of claim 15, wherein the first and second lenses comprise hemispherical lenses.

19. The housing of claim 18, wherein the first and second hemispherical lenses form a sphere.

20. A housing for an optical transceiver, comprising:
  a) a laser diode mounting hole;
  b) a photodiode mounting hole;
  c) an optical fiber mounting hole; and
  d) an internal cavity configured to house a first lens, a second lens, and an optical splitter between the first and second lenses;
  wherein the housing has upper and lower walls defining the internal cavity, the upper wall has fillets at an interface with a passage between the internal cavity and the photodiode mounting hole, the fillets being configured to secure the second lens in place in the internal cavity, the lower wall has at least one slot or fillet configured to mount the first lens thereon, the first and second lenses each have a diameter greater than a distance between the upper and lower walls, and the first and second lenses are mounted in the internal cavity along an optical path between the laser diode mounting hole and the optical fiber mounting hole, at an intersection with the photodiode mounting hole.

21. The housing of claim 20, wherein the optical splitter is between the first and second lenses.

22. The housing of claim 20, wherein the lower wall comprises the at least one slot.

23. The housing of claim 20, wherein the housing is configured so that the first lens, the second lens, a laser diode in the laser diode mounting hole, and the optical splitter share a common linear optical axis.

24. The housing of claim 23, wherein the optical splitter is at an angle of 45 degrees with respect to the optical axis.

25. The housing of claim 20, wherein the first and second lenses comprise hemispherical lenses.

26. The housing of claim 25, wherein the first and second hemispherical lenses form a sphere.

* * * * *